U S 0 1 1 5 7 5 1 7 9 B 2

US011575179B2

(12) United States Patent
Kwon et al.

(10) Patent No.: US 11,575,179 B2
(45) Date of Patent: Feb. 7, 2023

(54) SEPARATOR AND ELECTROCHEMICAL DEVICE CONTAINING THE SAME

(71) Applicant: LG CHEM, LTD., Seoul (KR)

(72) Inventors: Hye-Jin Kwon, Daejeon (KR); Myeong-Soo Kim, Daejeon (KR); In-Hyouk Sung, Daejeon (KR); Su-Jin Yoon, Daejeon (KR); Je-An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 475 days.

(21) Appl. No.: 16/530,384

(22) Filed: Aug. 2, 2019

(65) Prior Publication Data
US 2020/0251708 A1 Aug. 6, 2020

Related U.S. Application Data

(63) Continuation of application No. PCT/KR2018/015724, filed on Dec. 11, 2018.

(30) Foreign Application Priority Data

Dec. 11, 2017 (KR) ........................ 10-2017-0169386

(51) Int. Cl.
*H01M 50/44* (2021.01)
*H01M 50/46* (2021.01)
(Continued)

(52) U.S. Cl.
CPC ......... *H01M 50/446* (2021.01); *H01M 4/622* (2013.01); *H01M 10/0525* (2013.01); *H01M 50/461* (2021.01)

(58) Field of Classification Search
None
See application file for complete search history.

(56) References Cited

U.S. PATENT DOCUMENTS

2012/0189897 A1 7/2012 Wakizaka et al.
2013/0011715 A1 1/2013 Lee et al.
(Continued)

FOREIGN PATENT DOCUMENTS

CN 102177212 A 9/2011
JP 2015-28842 A 2/2015
(Continued)

OTHER PUBLICATIONS

"Laser diffraction type particle size distribution measuring device," URL: https://www.an.shimadzu.co.jp/powder/lecture/practice/p01/lesson17.htm, 2021, 4 pages with English translation.
(Continued)

Primary Examiner — Barbara L Gilliam
Assistant Examiner — Angela J Martin
(74) Attorney, Agent, or Firm — Birch, Stewart, Kolasch & Birch, LLP

(57) ABSTRACT

A separator and an electrochemical device including the same. The separator includes an adhesive layer including first adhesive resin particles having an average particle diameter corresponding to 0.8-3 times of an average particle diameter of the inorganic particles and second adhesive resin particles having an average particle diameter corresponding to 0.2-0.6 times of the average particle diameter of the inorganic particles, wherein the first adhesive resin particles are present in an amount of 30-90 wt % based on a total weight of the first adhesive resin particles and the second adhesive resin particles. The separator shows improved adhesion to an electrode and provides an electrochemical device with decreased increment in resistance after lamination with an electrode.

15 Claims, 11 Drawing Sheets

(51) Int. Cl.
*H01M 4/62* (2006.01)
*H01M 10/05* (2010.01)
*H01M 50/446* (2021.01)
*H01M 10/0525* (2010.01)

(56) References Cited

U.S. PATENT DOCUMENTS

| | | |
|---|---|---|
| 2013/0029126 A1 | 1/2013 | Yen |
| 2013/0224555 A1 | 8/2013 | Hong |
| 2014/0147726 A1 | 5/2014 | Toyoda |
| 2015/0303427 A1 | 10/2015 | Hyun et al. |
| 2015/0333309 A1 | 11/2015 | Lai et al. |
| 2017/0331094 A1 | 11/2017 | Lee et al. |
| 2018/0287189 A1 | 10/2018 | Maruhashi et al. |

FOREIGN PATENT DOCUMENTS

| | | | | |
|---|---|---|---|---|
| JP | 2015-41603 A | | 3/2015 | |
| JP | 2015-220223 A | | 12/2015 | |
| JP | 2017-103030 A | * | 6/2017 | ........ H01M 10/0566 |
| JP | 2017-103030 A | | 6/2017 | |
| JP | 2017-103056 A | | 6/2017 | |
| KR | 10-1298340 B1 | | 8/2013 | |
| KR | 10-2013-0099592 A | | 9/2013 | |
| KR | 10-2016-0016202 A | | 2/2016 | |
| KR | 10-2016-0048697 A | | 5/2016 | |
| KR | 10-2016-0117109 A | | 10/2016 | |
| KR | 10-2016-0136089 A | | 11/2016 | |
| KR | 2016-0136089 | * | 11/2016 | .......... H01M 10/052 |
| KR | 10-2017-0045438 A | | 4/2017 | |
| KR | 2017-0045438 A | * | 4/2017 | ............. H01M 2/16 |
| KR | 10-2017-0068979 A | | 6/2017 | |
| KR | 10-2017-0112250 A | | 10/2017 | |
| KR | 20170112250 | * | 10/2017 | ............ H01M 10/04 |
| WO | WO 2011/040562 A1 | | 4/2011 | |
| WO | WO 2012/099149 A1 | | 7/2012 | |
| WO | WO 2013/005796 A1 | | 1/2013 | |
| WO | WO 2014/103792 A1 | | 7/2014 | |
| WO | WO 2016/103559 A1 | | 6/2016 | |
| WO | WO 2017/047576 A1 | | 3/2017 | |
| WO | WO 2017/073022 A1 | | 5/2017 | |

OTHER PUBLICATIONS

Arakawa. "An Introduction for Particle Size Measurement," A Journal of Powder Engineering, Japan, Jun. 10, 1980; vol. 17, No. 6, pp. 299-307.

KR-10-2017-0045438-A, dated Apr. 27, 2017, with an English Machine translation.

International Search Report issued in PCT/KR2018/015724 (PCT/ISA/210), dated Mar. 18, 2019.

English machine translation JP 2017-103030 A, published Jun. 8, 2017.

English machine translation JP 2017-103056 A, published Jun. 8, 2017.

English machine translation WO 2016/103559 A1, published Jun. 30, 2016.

* cited by examiner

SEPARATOR AND ELECTROCHEMICAL DEVICE CONTAINING THE SAME

CROSS-REFERENCE TO RELATED APPLICATIONS

The present application is a By-Pass Continuation of International Application PCT/KR2018/015724, filed Dec. 11, 2018, which claims priority to Korean Patent Application No. 10-2017-0169386, filed on Dec. 11, 2017, in the Korean Intellectual Property Office, the disclosures of which are incorporated herein in their entirety by reference.

TECHNICAL FIELD

The present disclosure relates to a separator that may be used for an electrochemical device, such as a lithium secondary battery, and an electrochemical device including the same.

BACKGROUND ART

Recently, energy storage technology has been given increased attention. Efforts into research and development for electrochemical devices have been actualized more and more, as the application of energy storage technology has been extended to energy for cellular phones, camcorders, notebook PC and electric vehicles. In this context, electrochemical devices have been spotlighted. Among such electrochemical devices, development of rechargeable secondary batteries has been of focus. More recently, active studies have been conducted about designing a novel electrode and battery in order to improve the capacity density and specific energy in developing such batteries.

Among commercially available secondary batteries, lithium secondary batteries developed in the early 1990's have been spotlighted, since they have a higher operating voltage and significantly higher energy density as compared to conventional batteries, such as Ni—MH, Ni—Cd and sulfuric acid-lead batteries using an aqueous electrolyte.

Although such electrochemical devices have been produced from many production companies, the safety characteristics thereof show different signs. Evaluation and securement of the safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problem of an electrochemical device, there has been suggested a separator having a porous organic/inorganic coating layer formed by coating a mixture of an excessive amount of inorganic particles with a binder polymer onto at least one surface of a porous polymer substrate having pores. In addition, an adhesive layer has been introduced onto the porous organic/inorganic coating layer in order to increase the adhesion between a separator and an electrode.

However, the adhesive layer according to the related art merely uses adhesive resin particles having a uniform diameter, and thus the adhesive resin particles are accumulated homogeneously in the adhesive layer to cause high resistance of the separator. On the other hand, when reducing the coating amount of adhesive resin particles to reduce resistance, the adhesion between a separator and an electrode is decreased undesirably.

DISCLOSURE

Technical Problem

The present disclosure is directed to providing a separator which may have improved adhesion to an electrode and may show decreased increment in resistance after lamination with an electrode.

The present disclosure is also directed to providing an electrochemical device including the separator.

Technical Solution

In one aspect of the present disclosure, there is provided a separator for an electrochemical device according to any one of the following embodiments.

According to an embodiment, there is provided a separator for an electrochemical device which includes:

a porous polymer substrate having pores;

a porous coating layer present on at least one surface of the porous polymer substrate, and including inorganic particles and a binder polymer disposed partially or totally on a surface of the inorganic particles, wherein the binder polymer connects and fixes the inorganic particles with each other; and an adhesive layer present on a surface of the porous coating layer, and including first adhesive resin particles having an average particle diameter corresponding to 0.8-3 times of an average particle diameter of the inorganic particles and second adhesive resin particles having an average particle diameter corresponding to 0.2-0.6 times of the average particle diameter of the inorganic particles, wherein the first adhesive resin particles are present in an amount of 30-90 wt % based on a total weight of the first adhesive resin particles and the second adhesive resin particles.

According to another embodiment, there is provided the separator for an electrochemical device as defined in the above embodiment, wherein the average particle diameter of the inorganic particles is 100-700 nm.

According to another embodiment, there is provided the separator for an electrochemical device as defined in any one of the above embodiments, wherein the first and second adhesive resin particles independently include one or more selected from the group consisting of styrene butadiene rubber (SBR), acrylonitrile-butadiene rubber, acrylonitrile-butadiene-styrene rubber, polybutyl acrylate-co-ethylhexyl acrylate, polymethyl methacrylate-co-ethylhexyl acrylate, polyacrylonitrile, polyvinyl chloride, polyvinylidene fluoride, polyvinyl alcohol, styrene and polycyanoacrylate.

According to another embodiment, there is provided the separator for an electrochemical device as defined in any one of the above embodiments, wherein the average particle diameter of the first adhesive resin particles is 1-2.5 times of the average particle diameter of the inorganic particles, and the average particle diameter of the second adhesive resin particles is 0.3-0.6 times of the average particle diameter of the inorganic particles.

According to another embodiment, there is provided the separator for an electrochemical device as defined in any one of the above embodiments, wherein the average particle diameter of the first adhesive resin particles is 1-2 times of the average particle diameter of the inorganic particles, and the average particle diameter of the second adhesive resin particles is 0.3-0.6 times of the average particle diameter of the inorganic particles.

According to another embodiment, there is provided the separator for an electrochemical device as defined in any one of the above embodiments, wherein the first adhesive resin particles are present in an amount of 50-85 wt % based on the total weight of the first adhesive resin particles and the second adhesive resin particles.

According to another embodiment, there is provided the separator for an electrochemical device as defined in any one of the above embodiments, wherein the inorganic particle include one or more selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMNPT, $0<x<1$), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $AlO(OH)$, $SiO_2$, $TiO_2$ and SiC. According to another embodiment, there is provided the separator for an electrochemical device as defined in any one of the above embodiments, wherein the porous coating layer has a thickness of 1-10 μm.

According to another embodiment, there is provided the separator for an electrochemical device as defined in any one of the above embodiments, wherein the adhesive layer has a thickness of 0.5-3 μm.

According to another embodiment, there is provided the separator for an electrochemical device as defined in any one of the above embodiments, wherein the porous coating layer is present directly on the surface of the porous polymer substrate.

According to another embodiment, there is provided the separator for an electrochemical device as defined in any one of the above embodiments, wherein the adhesive layer is present directly on the surface of the porous coating layer.

According to another embodiment, there is provided the separator for an electrochemical device as defined in any one of the above embodiments, wherein the first and second adhesive resin particles include the same resin.

According to another embodiment, there is provided the separator for an electrochemical device as defined in any one of the above embodiments, wherein the first and second adhesive resin particles include different resins.

According to another embodiment, there is provided the separator for an electrochemical device as defined in any one of the above embodiments, wherein an upper portion of the adhesive layer has a larger number of pores as compared to a lower portion of the adhesive layer, said lower portion being in contact with the surface of the porous coating layer. In another aspect of the present disclosure, there is provided an electrochemical device according to any one of the following embodiments.

According to another embodiment, there is provided an electrochemical device including a cathode, an anode and a separator interposed between the cathode and the anode, wherein the separator is as defined in any one of the above embodiments.

According to another embodiment, there is provided the electrochemical device as defined in the above embodiment, which is a lithium secondary battery.

Advantageous Effects

In the separator according to an embodiment of the present disclosure, the adhesive layer is present (e.g., present by coating) on the surface of the porous coating layer and includes first and second adhesive resin particles having a different ratio of average particle diameter based on the average particle diameter of the inorganic particles. Thus, an increment in resistance is relatively low after lamination of the separator with an electrode. In addition, pores may be formed in the adhesive layer to cause a decrease in resistance. Further, the adhesion between the separator and an electrode may be improved significantly.

DESCRIPTION OF DRAWING

The FIGURE is a schematic view illustrating the separator according to an embodiment of the present disclosure.

BEST MODE

Figure 1A:
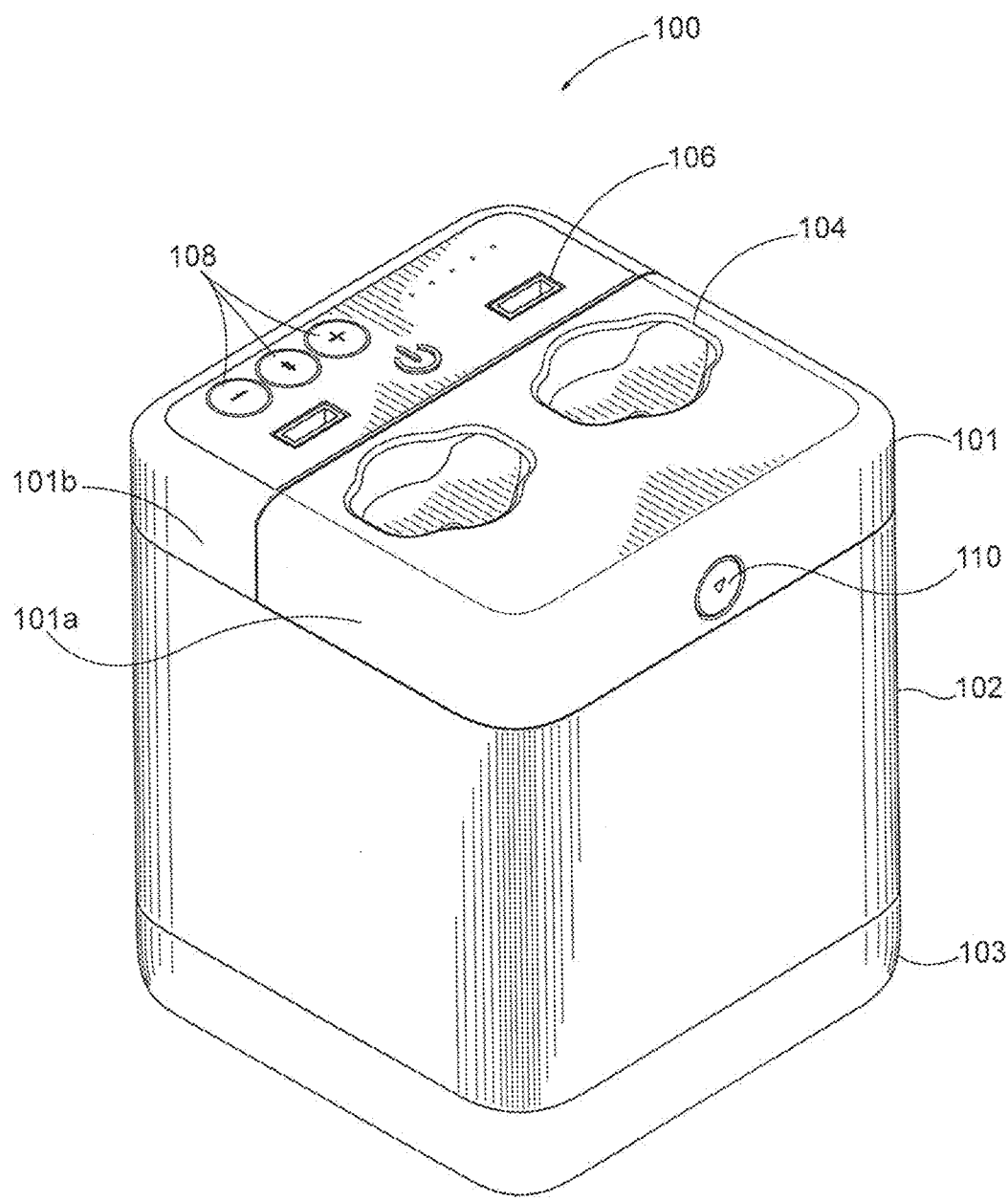
Figure 1B:
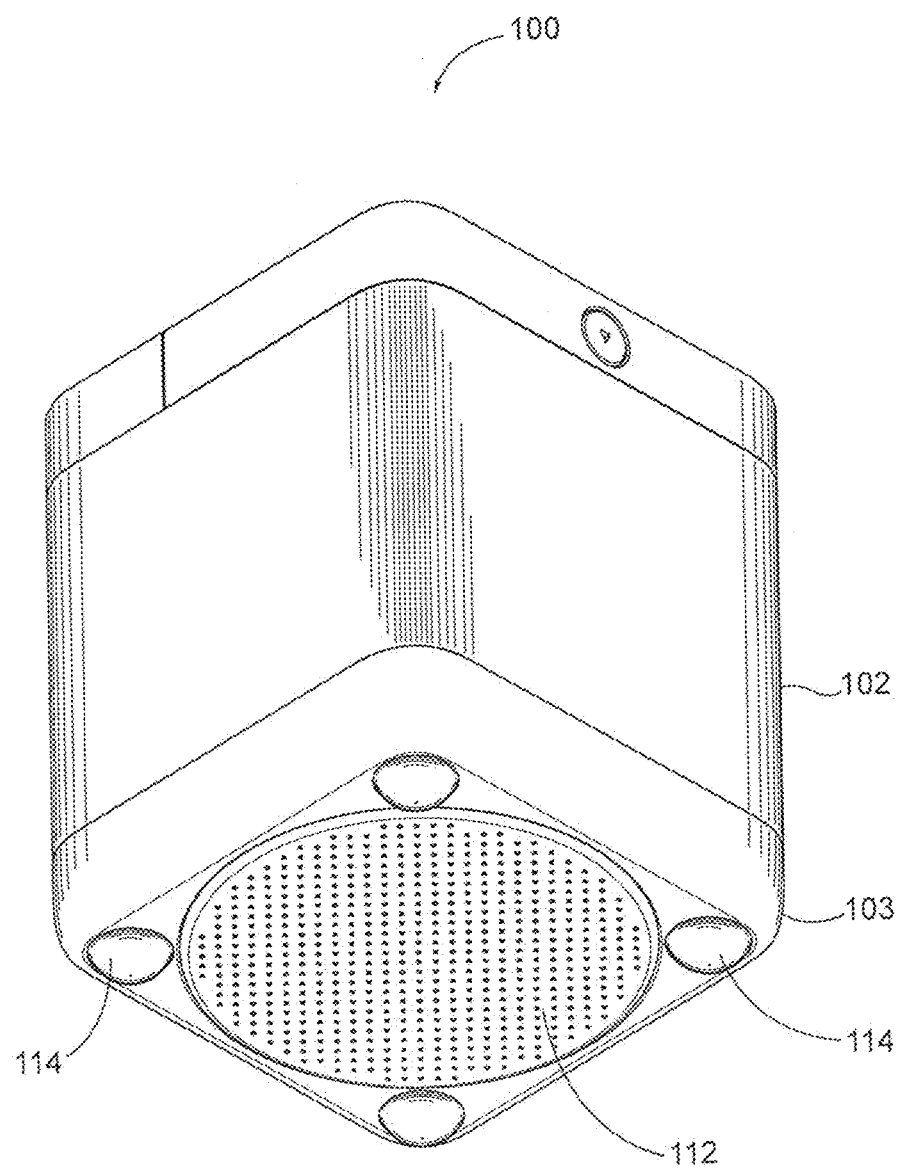
Figure 2:
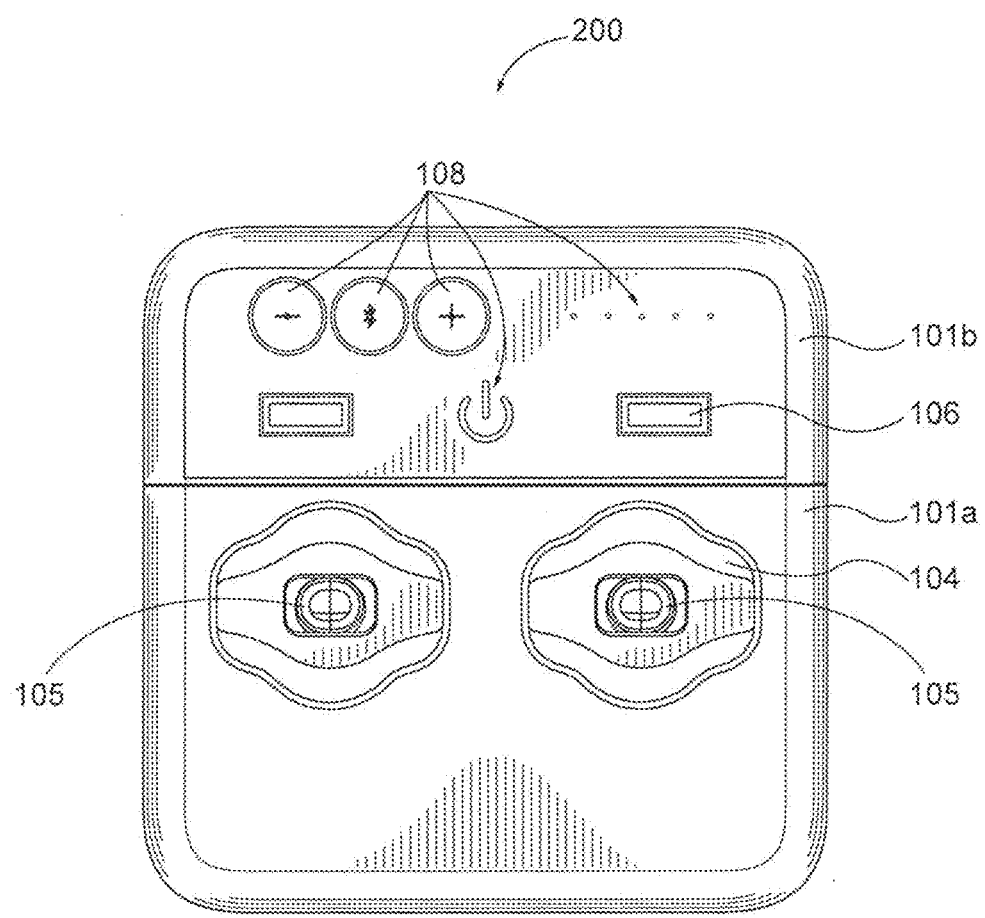
Figure 3A:
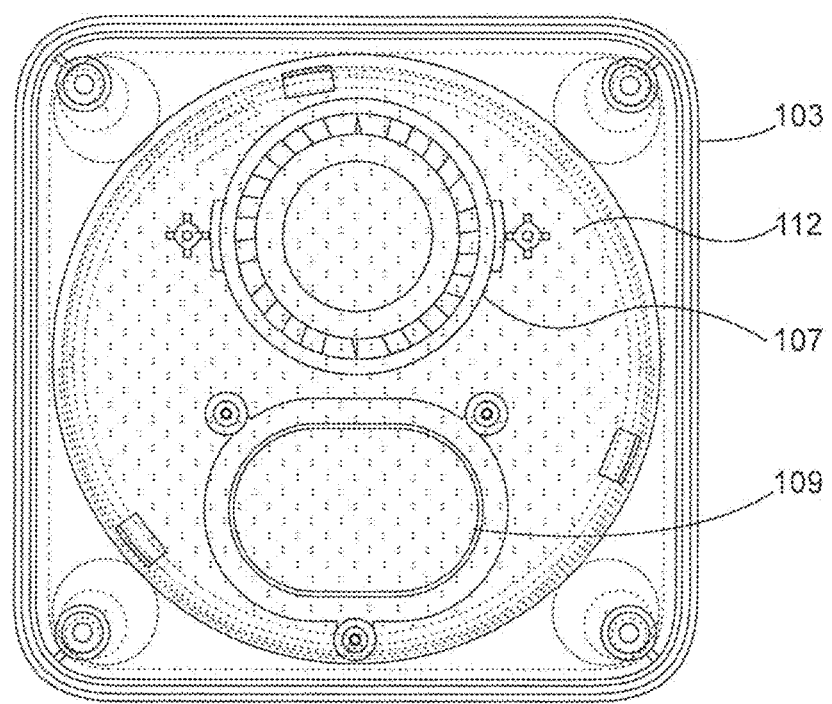
Figure 3B:
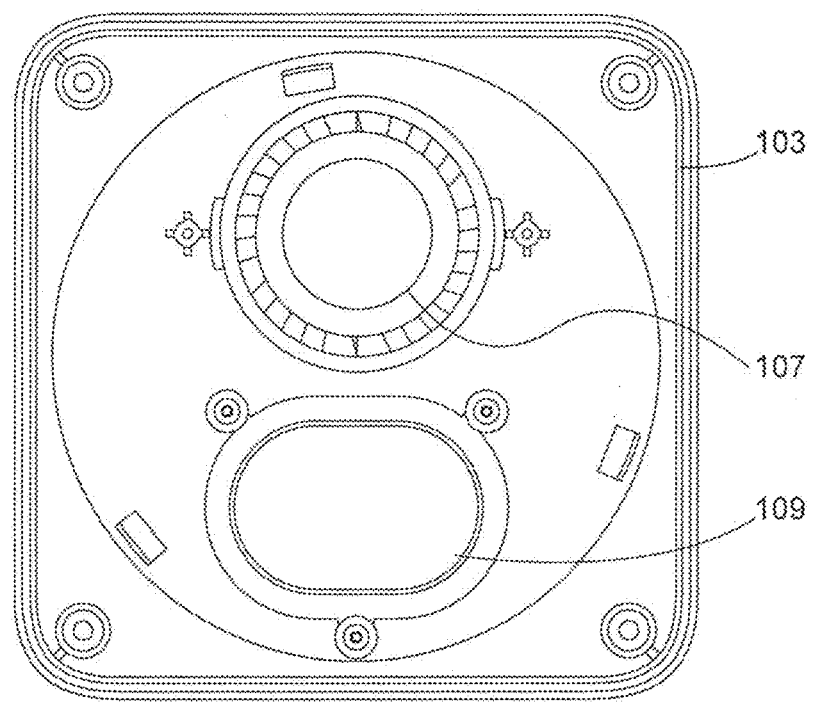
Figure 3C:
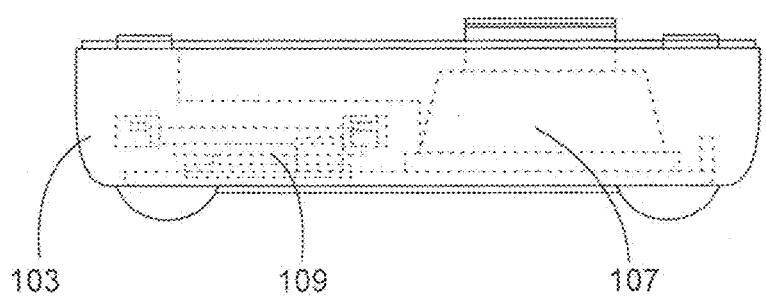
Figure 4A:
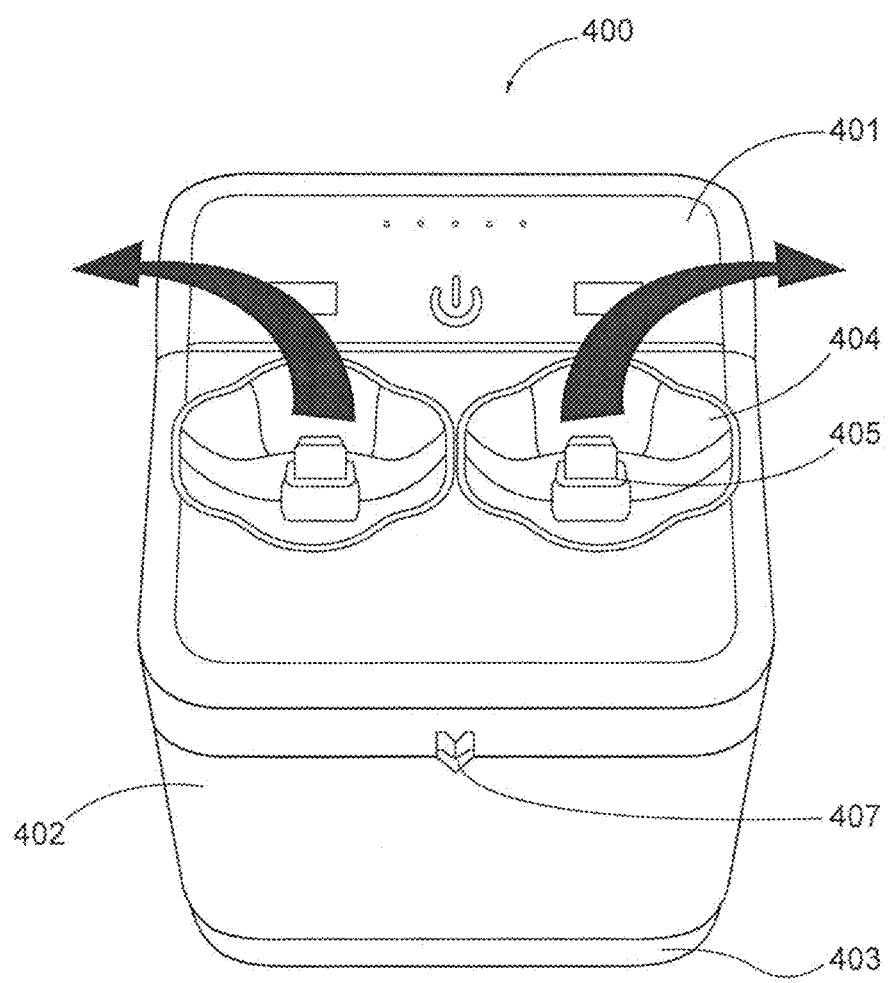
Figure 4B:
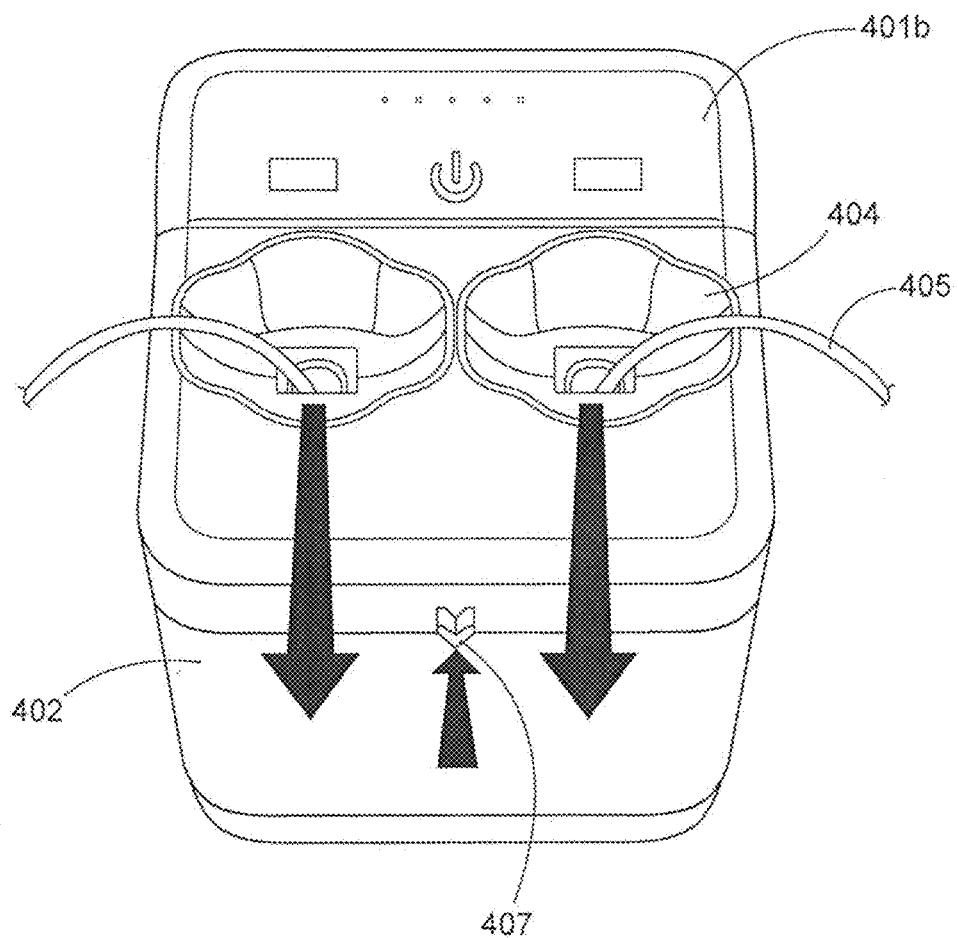
Figure 4C:
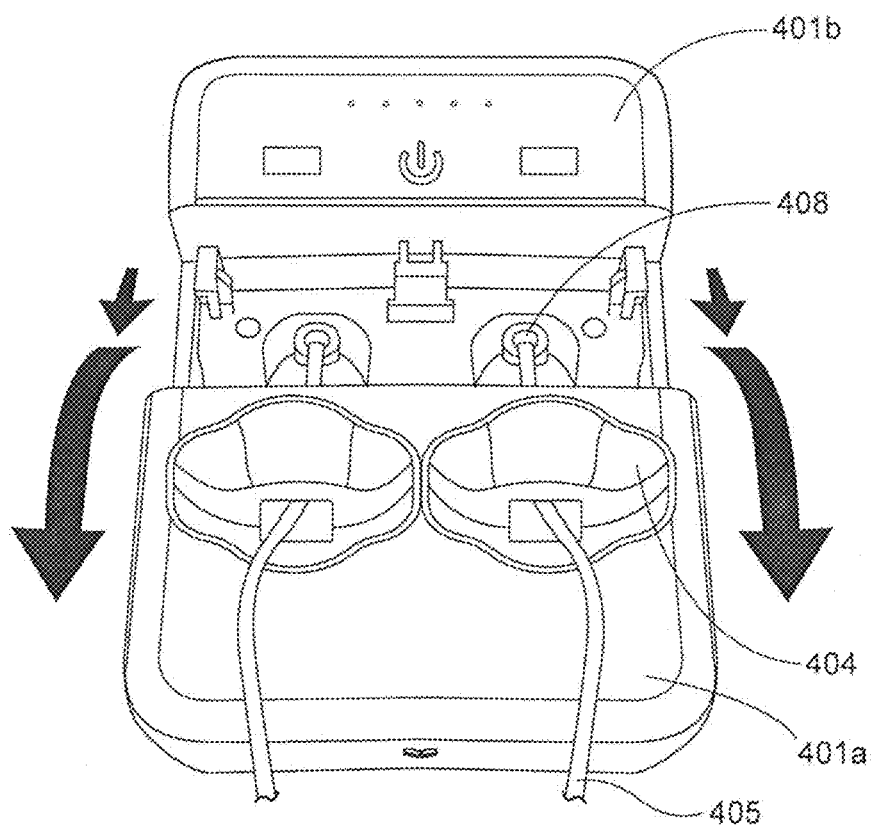
Figure 4D:
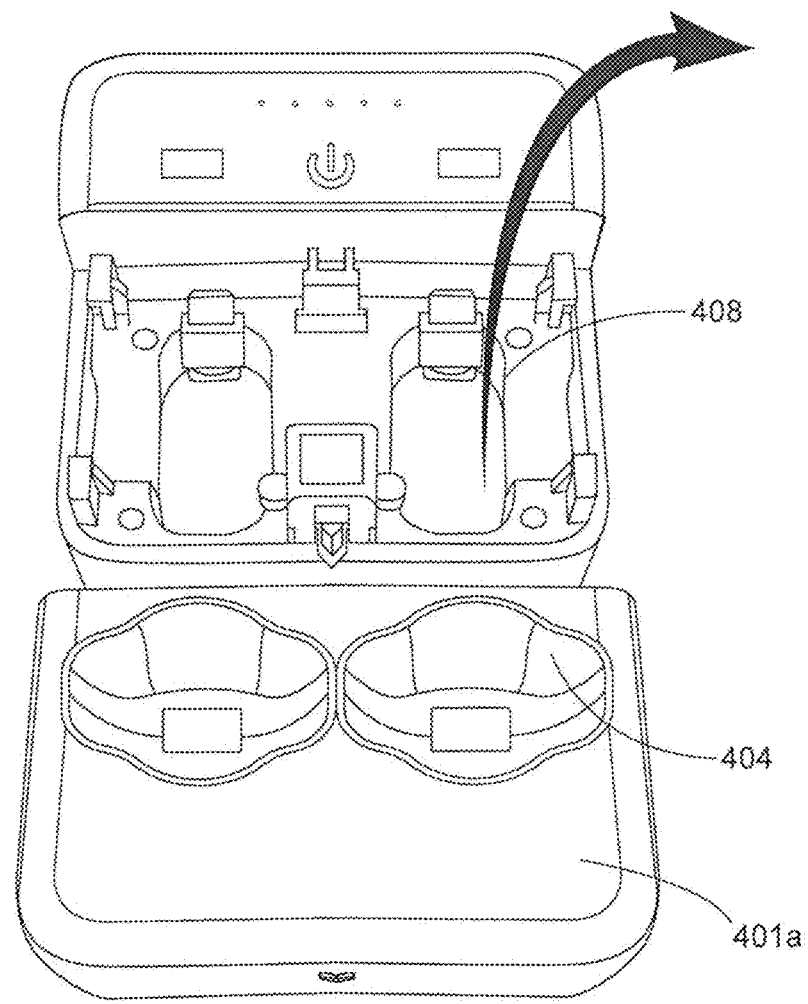
Figure 5:
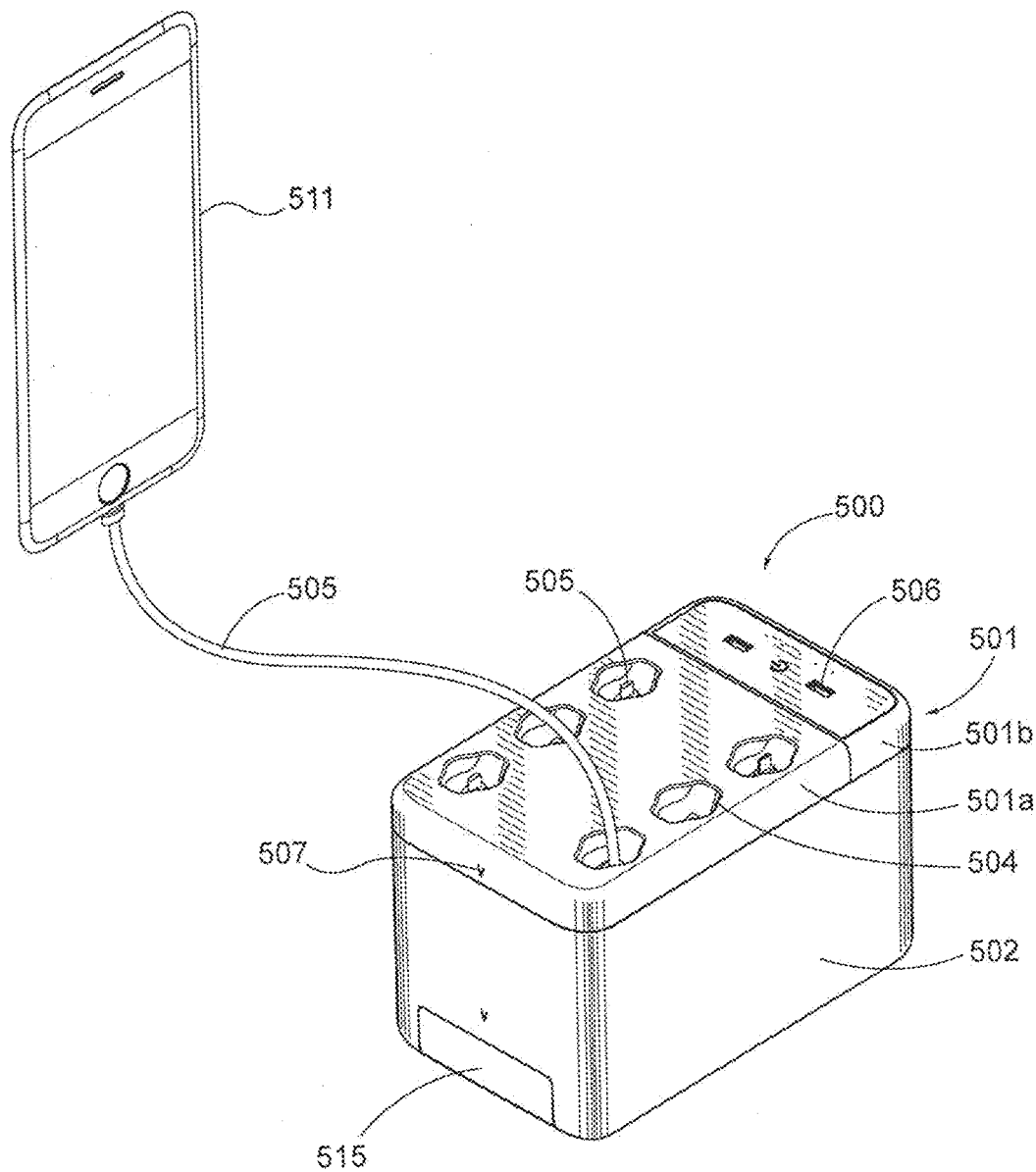
Figure 6:
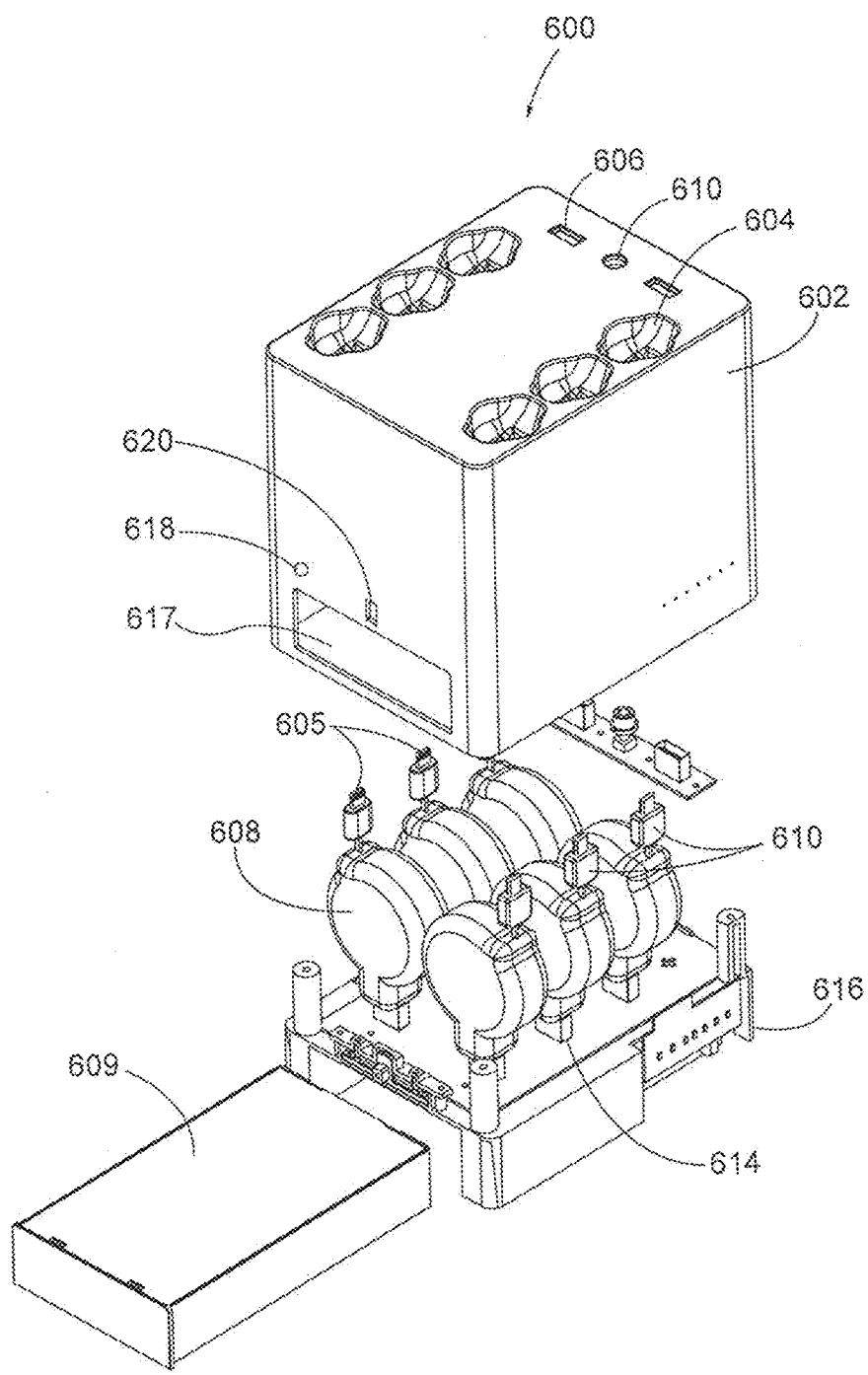

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected electrically to another portion' by way of the other element interposed between them.

Throughout the specification, the expression 'a part [includes] an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination(s) thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In an electrochemical device, such as a lithium secondary battery, an adhesive layer has been introduced onto a porous organic/inorganic coating layer in order to increase the adhesion between a separator and an electrode.

However, since a conventional adhesive layer merely uses adhesive resin particles having a uniform size, there is a problem of a rapid increase in resistance of an electrode assembly after lamination with an electrode. On the other hand, when the coating amount of adhesive layer is decreased in order to reduce resistance, the adhesion between an electrode and a separator is decreased undesirably.

To solve the above-mentioned problem, the separator for an electrochemical device according to an embodiment of the present disclosure includes: a porous polymer substrate having pores; a porous coating layer present on at least one surface of the porous polymer substrate, and including inorganic particles and a binder polymer disposed partially or totally on a surface of the inorganic particles, wherein the binder polymer connects and fixes the inorganic particles with each other; and an adhesive layer present on a surface of the porous coating layer, and including first adhesive resin particles having an average particle diameter corresponding to 0.8-3 times of an average particle diameter of the inorganic particles and second adhesive resin particles having an average particle diameter corresponding to 0.2-0.6 times of the average particle diameter of the inorganic particles.

As shown in the FIGURE, the separator 100 for an electrochemical device according to the present disclosure includes: a porous polymer substrate 10; a porous coating layer 20 present on at least one surface of the porous polymer substrate; and an adhesive layer 30 present on a surface of the porous coating layer. The porous coating layer 20 includes inorganic particles 21 and a binder polymer (not shown). The adhesive layer 30 includes first adhesive resin particles 31 having an average particle diameter corresponding to 0.8-3 times of an average particle diameter of the inorganic particles 21 and second adhesive resin particles 32 having an average particle diameter corresponding to 0.2-0.6 times of the average particle diameter of the inorganic particles 21.

As used herein, the term 'diameter' or 'average particle diameter' refers to the average particle diameter ($D_{50}$) of inorganic particles or adhesive resin particles, and may be defined as particle diameter corresponding to 50% of particle diameter distribution. According to an embodiment of the present disclosure, the average particle diameter may be determined by using a laser diffraction method. The laser diffraction method can determine a particle diameter ranging from the submicron region to several nm and provide results with high reproducibility and high resolution.

The separator according to an embodiment of the present disclosure includes at least two types of adhesive resin particles having a different size (e.g., different average particle diameters) in the adhesive layer. When using adhesive resin particles having a uniform size alone, the adhesive layer coated on the porous coating layer has a structure in which the adhesive resin particles are accumulated homogeneously, and thus shows high resistance. On the contrary, the adhesive layer according to the present disclosure includes adhesive resin particles having a different size (e.g., at least first and second adhesive resin particles) and the adhesive resin particles may be accumulated loosely and/or coarsely in the adhesive layer, and thus the adhesive layer may show decreased resistance as compared to the conventional adhesive layer.

In addition, the separator according to an embodiment of the present disclosure may be advantageous in that Lami Strength may be increased as compared to the adhesive layer merely including adhesive resin particles having an average particle diameter significantly smaller than the average particle diameter of the inorganic particles.

The separator according to an embodiment of the present disclosure includes at least two types of adhesive resin particles having a different size (e.g., at least first and second adhesive resin particles) in the adhesive layer, and may show significantly decreased increment in resistance after lamination with an electrode, as compared to the adhesive layer merely including adhesive resin particles having a uniform size.

The resistance after lamination with an electrode may be more affected by the pore distribution and pore size in the area between the porous coating layer and the electrode than the pore distribution and pore size of the porous coating layer. In other words, the resistance after lamination may be more affected by the pore distribution and pore size in the adhesive layer. The separator according to an embodiment of the present disclosure includes at least two types of adhesive resin particles having a different average particle diameter (i.e., at least first and second adhesive resin particles), wherein the second adhesive resin particles having an average particle diameter corresponding to 0.2-0.6 times of the average particle diameter of the inorganic particles may be positioned closer to the surface of the porous coating layer as compared to an upper surface of the adhesive layer (said upper surface being the surface to be contacted with the electrode). For instance, the second adhesive resin particles may be positioned in gaps in the inorganic particles forming the porous coating layer. Further, the first adhesive resin particles having a larger diameter as compared to the inorganic particles may be positioned largely on the upper surface of the porous coating layer. Therefore, as shown in the FIGURE, the portion of the adhesive layer where the adhesive layer will be in contact with the electrode, i.e., the upper surface of the adhesive layer, has a larger number of pores as compared to the portion of the adhesive layer in contact with the porous coating layer, and thus shows decreased increment in resistance after lamination with the electrode, as compared to the case in which conventional adhesive resin particles having a uniform size are used alone.

As shown in the FIGURE, the second adhesive resin particles in the separator according to an embodiment of the present disclosure have an average particle diameter corresponding to 0.2-0.6 times of the average particle diameter of the inorganic particles. In other words, the second adhesive resin particles have a smaller average particle diameter as compared to the inorganic particles. Therefore, the second adhesive resin particles may infiltrate the surface of the porous coating layer and a part of the porous coating layer to improve the adhesion of the inorganic particles among themselves and to improve the adhesion between the inorganic particles and the first adhesive resin particles.

The separator according to an embodiment of the present disclosure is provided with an adhesive layer including first adhesive resin particles having an average particle diameter corresponding to 0.8-3 times of the average particle diameter of the inorganic particles and the second adhesive resin particles having an average particle diameter corresponding to 0.2-0.6 times of the average particle diameter of the inorganic particles. Preferably, the average particle diameter of the first adhesive resin particles is 1-2.5 times, and more preferably is 1-2 times the average particle diameter of the inorganic particles is. In addition, the average particle diameter of the second adhesive resin particles is 0.2-0.6 times, and more preferably is 0.3-0.6 times the average particle diameter of the inorganic particles.

When an adhesive layer includes at least two types of adhesive resin particles having a different size, use of first adhesive resin particles having an average particle diameter larger than 3 times of the average particle diameter of the inorganic particles may cause the problems of an increase in thickness of the adhesive layer at the same loading amount and an increase in resistance between an electrode and the separator. When the average particle diameter of the first adhesive resin particles is less than 0.8 times the average particle diameter of the inorganic particle, the first adhesive resin particles may infiltrate to the porous coating layer, which may result in a failure in formation of an adhesive layer. In this case, since there may be little difference in diameter between the first adhesive resin particles and the second adhesive resin particles, the resistance of an electrode may be significantly increased, like in the case of adhesive resin particles having a uniform size.

Meanwhile, when the average particle diameter of the second adhesive resin particles as compared to the average particle diameter of the inorganic particles is within the above-defined range, the separator itself may have low resistance, show significantly decreased increment in resistance after lamination with an electrode, and may be provided with excellent adhesion between the electrode and the separator.

Each of the first adhesive resin particle and the second adhesive resin particle may independently include one or more selected from the group consisting of styrene butadiene rubber (SBR), acrylonitrile-butadiene rubber, acrylonitrile-butadiene-styrene rubber, polybutyl acrylate-co-ethylhexyl acrylate, polymethyl methacrylate-co-ethylhexyl acrylate, polyacrylonitrile, polyvinyl chloride, polyvinylidene fluoride, polyvinyl alcohol, styrene and polycyanoacrylate.

According to an embodiment of the present disclosure, the inorganic particles are not particularly limited, as long as they are electrochemically stable. In other words, the inorganic particles are not particularly limited, as long as they cause no oxidation and/or reduction in the operating voltage range (e.g. 0-5V based on Li/Li$^+$) of an applicable electrochemical device. Particularly, when using inorganic particles having a high dielectric constant, they may contribute to an increase in dissociation degree of the electrolyte salt, particularly lithium salt, in a liquid electrolyte, and thus can improve ion conductivity of the electrolyte.

For these reasons, the inorganic particles may include inorganic particles having a dielectric constant of 5 or more, inorganic particles capable of transporting lithium ions or a mixture thereof.

The inorganic particles having a dielectric constant of 5 or more may include $Al_2O_3$, $SiO_2$, $ZrO_2$, $AlO(OH)$, $TiO_2$, $BaTiO_3$, $Pb(Zr_xTi_{1-x})O_3$ (PZT, wherein 0<x<1), $Pb_{1-x}La_xZr_{1-y}Ti_yO_3$ (PLZT, wherein 0<x<1, 0<y<1), (1-x)Pb$(Mg_{1/3}Nb_{2/3})O_3$-x-PbTiO$_3$ (PMN-PT, wherein 0<x<1), hafnia (HfO$_2$), SrTiO$_3$, SnO$_2$, CeO$_2$, MgO, NiO, CaO, ZnO, SiC or combinations thereof.

Particular examples of the inorganic particles capable of transporting lithium ions include lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$-based glass (0<x<4, 0<y<3), lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5), lithium nitride (Li$_x$N$_y$, 0<x<4, 0<y<2), SiS$_2$-based glass (Li$_x$Si$_y$S$_z$, 0<x<3, 0<y<2, 0<z<4), P$_2$S$_5$-based glass (Li$_x$P$_y$S$_z$, 0<x<3, 0<y<3, 0<z<7), or combinations thereof.

There is no particular limitation in average particle diameter of the inorganic particles. However, the inorganic particles preferably have an average particle diameter of 0.001-10 μm with a view to formation of a porous coating layer having a uniform thickness and adequate porosity. More preferably, the inorganic particles may have an average particle diameter of 100-700 nm, and more preferably an average particle diameter of 150-600 nm.

In the separator according to an embodiment of the present disclosure, the first adhesive resin particles may be present in an amount of 30-90 wt %, preferably 50-85 wt %, based on the total weight of the first adhesive resin particles and the second adhesive resin particles. Within the above-defined range of 30-90 wt %, resistance of an electrode assembly may be maintained at a low level after lamination with an electrode, and excellent adhesion may be provided between the electrode and the separator.

The adhesive layer may have a thickness of 0.5-3 μm, or 0.5-2 μm. Within the above-defined range of 0.5-3 μm, it may be possible to improve the adhesion between the electrode and the separator while not increasing resistance significantly.

In the separator according to an embodiment of the present disclosure, the porous polymer substrate may be a porous polymer film substrate or porous polymer non-woven web substrate.

The porous polymer film substrate may include a porous polymer film including a polyolefin, such as polyethylene or polypropylene. For example, such a polyolefin porous polymer film substrate may realize a shut-down function at a temperature of 80-130° C.

Herein, the polyolefin porous polymer film may include a polymer formed of polyethylene, such as high-density polyethylene, linear low-density polyethylene, low-density polyethylene and ultrahigh-molecular weight polyethylene polypropylene, polybutylene and polypentene alone or in combination.

In addition, the porous polymer film substrate may be prepared by using various polymers, such as polyesters, in addition to polyolefins and forming the polymers into a film shape. The porous polymer film substrate may be formed to have a stacked structure of two or more film layers, wherein each film layer may include the abovementioned polymers, such as polyolefins and polyesters, alone or in combination.

In addition to the above-mentioned polyolefins, the porous polymer film substrate and the porous non-woven web substrate may include polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalene, or the like, alone or in combination.

Although there is no particular limitation in the thickness of the porous polymer substrate, the porous polymer substrate may have a thickness of 1-100 μm, particularly 5-50 μm. Although the pore size and porosity of the pores present in the porous polymer substrate are not also limited particularly, it is preferred that the pore size and porosity are 0.01-50 μm and 10-95%, respectively.

In the separator according to an embodiment of the present disclosure, the binder polymer used for forming the porous coating layer may be one used currently for forming a porous coating layer in the art. Particularly, a polymer having a glass transition temperature (T$_g$) of −200 to 200° C. may be used. This is because such a polymer can improve the mechanical properties, such as flexibility and elasticity, of the finally formed porous coating layer. Such a binder polymer may function as a binder which connects and stably fixes the inorganic particles with each other, and thus may contribute to prevention of degradation of mechanical properties of a separator having a porous coating layer.

In addition, the binder polymer may have or may not have ion conductivity. When using a polymer having ion conductivity, it may be possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus show a high degree of swelling. Thus, the binder polymer may have a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ or more than 45 $MPa^{1/2}$, it may be difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polyethylhexyl acrylate, polybutyl acrylate, polyacrylonitrile, polyvinyl pyrrolidone, polyvinyl acetate, polybutyl acrylate-co-ethylhexyl acrylate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethyl cellulose, cyanoethyl sucrose, pullulan and carboxymethyl cellulose.

The weight ratio between the inorganic particles and the binder polymer may be 50:50-99:1, particularly 70:30-95:5. When the weight ratio of the inorganic particles based on the binder polymer satisfies the above-defined range of 50:50-99:1, it may be possible to prevent the problem of degradation of pore size and porosity of a coating layer caused by an increased amount of binder polymer. It may also be possible to solve the problem of weakening of peeling resistance of a coating layer caused by an insufficient amount of binder polymer.

Besides the above-mentioned inorganic particles and polymer, the separator according to an embodiment of the present disclosure may further include other additives as ingredients for the porous coating layer.

Although there is no particular limitation in the thickness of the porous coating layer, the porous coating layer may have a thickness of 1-10 μm, particularly 1.5-6 μm. Also, there is no particular limitation in the porosity of the porous coating layer, the porous coating layer may have a porosity of 35-65%.

The separator according to an embodiment of the present disclosure may be obtained by methods generally known in the art. According to an embodiment of the present disclosure, a slurry for forming a porous coating layer may be prepared by dispersing inorganic particles in a polymer dispersion containing a binder polymer dispersed in a solvent, and then the slurry for forming a porous coating layer may be applied to and dried on a porous polymer substrate to form a porous coating layer. Next, a slurry for forming an adhesive layer which includes the first adhesive resin particles and the second adhesive resin particles having a different size may be prepared, and then the slurry for forming an adhesive layer may be applied to and dried on the surface of the porous coating layer to form an adhesive layer.

The slurry for forming an adhesive layer may be applied preferably through a slot coating process or dip coating process.

In this case, it may be possible to reduce the resistance of the separator by controlling the size of the first adhesive resin particles and that of the second adhesive resin particles to a predetermined ratio. According to an embodiment of the present disclosure, the average particle diameter of the first adhesive resin particles may be controlled to 0.8-3 times of the average particle diameter of the inorganic particles and the average particle diameter of the second adhesive resin particles may be controlled to 0.2-0.6 times of the average particle diameter of the inorganic particles, thereby reducing the resistance of the separator. In addition, it may be possible to increase the adhesion between the separator and the electrode while reducing the resistance of the separator by controlling the content of the first adhesive resin particles having a larger diameter to be larger than the content of the second adhesive resin particles. Non-limiting examples of the solvent that may be used herein include water, acetone, tetrahydrofuran, methylene chloride, chloroform, dimethylformamide, N-methyl-2-pyrrolidone, methyl ethyl ketone, cyclohexane or combinations thereof. Preferably, the solvent may be water.

Although there is no particular limitation in the process for coating the slurry for forming a porous coating layer onto the porous polymer substrate, it is preferred to use a slot coating or dip coating process. A slot coating process includes coating the slurry supplied through a slot die onto the whole surface of a substrate and is capable of controlling the thickness of a coating layer depending on the flux supplied from a metering pump. In addition, dip coating includes dipping a substrate into a tank containing slurry to carry out coating and is capable of controlling the thickness of a coating layer depending on the concentration of the slurry and the rate of removing the substrate from the slurry tank. Further, in order to control the coating thickness more precisely, it is possible to carry out post-metering through a Mayer bar or the like, after dipping.

Then, the porous substrate coated with the slurry for forming a porous coating layer may be dried by using a dryer, such as an oven, thereby forming a porous coating layer on at least one surface of the porous polymer substrate.

In the porous coating layer, the inorganic particles may be bound among themselves by the binder polymer while they are packed and are in contact with each other. Thus, interstitial volumes are formed among the inorganic particles and the interstitial volumes become vacant spaces to form pores.

In other words, the binder polymer attaches the inorganic particles to each other so that they may retain their binding states. For example, the binder polymer connects and fixes the inorganic particles with each other. In addition, the pores of the porous coating layer may be those formed by the interstitial volumes among the inorganic particles which become vacant spaces. The space is defined by the inorganic particles facing each other substantially in a closely packed or densely packed structure of the inorganic particles.

The electrochemical device according to another aspect of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer ion batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are preferably used. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (g-butyrolactone) or a combination thereof. However, the present disclosure is not limited thereto.

Injection of the electrolyte may be carried out during the process for manufacturing a battery depending on the manufacturing process of a final product and properties required for a final product. In other words, injection of the electrolyte may be carried out, for instance, before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

1) Manufacture of Anode

Artificial graphite as an anode active material, carbon black as a conductive material, carboxymethyl cellulose (CMC) as a dispersing agent and polyvinylidene fluoride (PVDF) as a binder were mixed with water at a weight ratio of 95.8:1:1.2:2 to obtain an anode slurry. The anode slurry was coated onto copper (Cu) foil to a thickness of 50 μm to form a thin electrode plate, which, in turn, was dried at 135° C. for 3 hours and pressed to obtain an anode.

2) Manufacture of Cathode $LiCoO_2$ as a cathode active material, carbon black as a conductive material and polyvinylidene fluoride (PVDF) as a binder were introduced to N-methyl-2-pyrrolidone (NMP) at a weight ratio of 96:2:2 and then mixed to obtain a cathode slurry. The resultant cathode slurry was coated onto aluminum foil (thickness 20 μm) as a cathode current collector to a capacity of 3.1 $mAh/cm^2$ to obtain a cathode.

3) Manufacture of Separator 3-1) Formation of Porous Coating Layer

Carboxymethyl cellulose (CMC) was dissolved in water at room temperature to create a binder polymer solution, and $Al_2O_3$ inorganic particles (Sumitomo Co., AES11, particle size 500 nm) were introduced to the binder polymer solution, followed by agitation, to prepare a homogeneously dispersed slurry. Herein, the inorganic particles and CMC were used at a weight ratio of 95:5. Next, an acrylic binder, polybutyl acrylate-co-ethylhexyl acrylate (Toyo chem., CSB130), as a binder polymer was introduced to the dispersed slurry to obtain a slurry for a porous coating layer. Herein, CMC and the acrylic binder were used at a weight ratio of 98:5. The slurry for a porous coating layer was applied to one surface of a polyethylene porous polymer substrate (Asahi Co., ND509) by using a doctor blade and dried at 60° C. for 1 minute to prepare a porous polymer substrate having a porous coating layer formed thereon. The porous coating layer had a thickness of 2 μm.

3-2) Coating of Adhesive Layer

A slurry for forming an adhesive layer was applied to the surface of the porous coating layer formed on the porous polymer substrate obtained as described above, followed by drying at 60° C. for 1 minute, to form an adhesive layer. The adhesive layer was prepared as follows. At room temperature, polymethyl methacrylate-co-ethylhexyl acrylate (Zeon Co., LP17, particle size 500 nm) as the first adhesive resin particles and polybutyl acrylate-co-ethylhexyl acrylate (Toyochem. Co., CSB130, particle size 150 nm) as the second adhesive resin particles were dispersed homogeneously in water to prepare a slurry for forming an adhesive layer. The first adhesive resin particles and the second adhesive resin particles were used at a weight ratio of 85:15.

The slurry for forming an adhesive layer was applied to the porous coating layer obtained from 3-1) in an amount of 1.0 $g/m^2$ and then dried at 60° C. for 1 minute to form an adhesive layer on the surface of the porous coating layer. The ratio of the diameter of the second adhesive resin particles to that of the first adhesive resin particles was 0.3, and the adhesive layer had a thickness of 1 μm.

4) Adhesion Between Separator and Electrode

Then, the separator was laminated with the anode so that the adhesive layer faced the anode active material layer of the anode as described in 1), and then pressing was carried out at 90° C. under 8.5 Mpa for 1 second to obtain an electrode assembly including the anode laminated with the separator.

EXAMPLES 2-4

Separators were obtained in the same manner as described in Example 1, except that the average particle diameter of the inorganic particles, the first adhesive resin particles and the second adhesive resin particles, and content of the first adhesive resin particles and the second adhesive resin particles were controlled as shown in the following Table 1.

Comparative Example 1

A separator was obtained in the same manner as described in Example 1, except that only the first adhesive resin particles were used in the slurry for forming the adhesive layer.

Comparative Example 2

A separator was obtained in the same manner as described in Example 1, except that only the second adhesive resin particles were used in the slurry for forming the adhesive layer.

Comparative Examples 3-7

Separators were obtained in the same manner as described in Example 1, except that the average particle diameter of the inorganic particles, the first adhesive resin particles and the second adhesive resin particles, and content of the first adhesive resin particles and the second adhesive resin particles were controlled as shown in the following Table 2.

TABLE 1

|  | Example 1 Particle diameter of the first adhesive resin particles and that of the second adhesive resin particles | Example 2 Particle diameter of the first adhesive resin particles and that of the second adhesive resin particles | Example 3 Content of the first adhesive resin particles and that of the second adhesive resin particles | Example 4 Content of the first adhesive resin particles and that of the second adhesive resin particles |
|---|---|---|---|---|
| Particle diameter of the first adhesive resin particles | 500 nm | 500 nm | 500 nm | 500 nm |
| Particle diameter of the second adhesive resin particles | 150 nm | 150 nm | 150 nm | 150 nm |
| Particle diameter of inorganic particles | 500 nm | 250 nm | 500 nm | 500 nm |
| Particle diameter of the first adhesive resin particles to that of inorganic particles | 1 | 2 | 1 | 1 |
| Particle diameter of the second adhesive resin particles to that of inorganic particles | 0.3 | 0.6 | 0.3 | 0.3 |
| Particle diameter of the first adhesive resin particles to that of the second adhesive resin particles | 3 | 3 | 3 | 3 |
| Content of the first adhesive resin particles to that of the second adhesive resin particles (weight ratio) | 85:15 | 85:15 | 50:50 | 70:30 |
| Resistance of separator (Ω) | 0.90 | 0.83 | 0.82 | 0.86 |
| Resistance after lamination with electrode (Ω) | 1.91 | 1.73 | 1.83 | 1.88 |
| Adhesion between electrode and separator (gf/15 mm) | 40 | 54 | 35 | 37 |

TABLE 2

|  | Comp. Ex. 1 Particle diameter of the first adhesive resin particles and that of the second adhesive resin particles | Comp. Ex. 2 Particle diameter of the first adhesive resin particles and that of the second adhesive resin particles | Comp. Ex. 3 Particle diameter of the first adhesive resin particles and that of the second adhesive resin particles | Comp. Ex. 4 Particle diameter of the first adhesive resin particles and that of the second adhesive resin particles | Comp. Ex. 5 Content of the first adhesive resin particles and that of the second adhesive resin particles | Comp. Ex. 6 Content of the first adhesive resin particles and that of the second adhesive resin particles | Comp. Ex. 7 Particle diameter of the first adhesive resin particles and that of the second adhesive resin particles |
|---|---|---|---|---|---|---|---|
| Particle diameter of the first adhesive resin particles | 500 nm | — | 500 nm | 500 nm | 500 nm | 500 nm | 1000 nm |
| Particle diameter of the second adhesive resin particles | — | 150 nm | 90 nm | 350 nm | 150 nm | 150 nm | 150 nm |
| Particle diameter of inorganic particles | 500 nm | 500 nm | 500 nm | 500 nm | 500 nm | 500 nm | 250 nm |
| Particle diameter of the first adhesive resin particles to that of inorganic particles | 1 | — | 1 | 1 | 1 | 1 | 4 |
| Particle diameter of the second adhesive resin particles to that of inorganic particles | — | 0.3 | 0.18 | 0.7 | 0.3 | 0.3 | 0.6 |
| Particle diameter of the first adhesive resin particles to that of the second adhesive resin particles | — | — | 5.5 | 1.4 | 3 | 3 | 6.7 |
| Content of the first adhesive resin particles tot hat of the second adhesive resin particles (weight ratio) | 100:0 | 0:100 | 85:15 | 85:15 | 20:80 | 95:5 | 85:15 |
| Resistance of separator (Ω) | 0.93 | 1.01 | 0.88 | 0.90 | 0.98 | 1.03 | Hard to prepare adhesive resin of 1000 nm or more |
| Resistance after lamination with electrode (Ω) | 4.27 | 1.00 | 4.02 | 4.13 | 3.52 | 3.93 | |

TABLE 2-continued

| | Comp. Ex. 1 Particle diameter of the first adhesive resin particles and that of the second adhesive resin particles | Comp. Ex. 2 Particle diameter of the first adhesive resin particles and that of the second adhesive resin particles | Comp. Ex. 3 Particle diameter of the first adhesive resin particles and that of the second adhesive resin particles | Comp. Ex. 4 Particle diameter of the first adhesive resin particles and that of the second adhesive resin particles | Comp. Ex. 5 Content of the first adhesive resin particles and that of the second adhesive resin particles | Comp. Ex. 6 Content of the first adhesive resin particles and that of the second adhesive resin particles | Comp. Ex. 7 Particle diameter of the first adhesive resin particles and that of the second adhesive resin particles |
|---|---|---|---|---|---|---|---|
| Adhesion between electrode and separator (gf/15 mm) | 30 | 1 | 25 | 28 | 7 | 27 | |

Test Methods

1) Determination of Particle Diameter

The average particle diameter of the inorganic particles, the first adhesive resin particles and the second adhesive resin particles were determined by using the laser diffraction method (Microtrac MT 3000).

2) Determination of Separator Resistance

The resistance means a resistance value when a separator is impregnated with an electrolyte. It was determined through impedance analysis by using an electrolyte containing 1M $LiBF_4$ in propylene carbonate/ethylene carbonate (weight ratio 1:1) at 20° C.

3) Determination of Resistance after Lamination with Electrode

The resistance means a resistance value when an electrode assembly is impregnated with an electrolyte. It was determined through impedance analysis by using an electrolyte containing 1M $LiBF_4$ in propylene carbonate/ethylene carbonate (weight ratio 1:1) at 20° C.

4) Determination of Adhesion (Lami Strength) between Electrode and Separator

An anode was obtained in the same manner as Example 1-1) and cut into a size of 15 mm×100 mm. Each of the separators according to Examples 1-4 and Comparative Examples 1-7 was cut into a size of 15 mm×100 mm. Each separator was stacked with a corresponding anode, inserted between PET films (100 μm) and adhered with each other by using a flat press. Herein, the flat press procedure was carried out by heating at 90° C. under 8.5 MPa for 1 second. The end of the adhered separator and anode was then mounted to an UTM system (LLOYD Instrument LF Plus), and then the force required for separating the separator from the anode facing the separator was measured by applying force thereto at 180° with a rate of 300 mm/min.

Description Of Drawing Numerals

100: Separator
10: Porous polymer substrate
20: Porous coating layer
21: Inorganic particles
30: Adhesive layer
31: First adhesive resin particles
32: Second adhesive resin particles

What is claimed is:

1. A separator for an electrochemical device which comprises:
   a porous polymer substrate having pores;
   a porous coating layer present on at least one surface of the porous polymer substrate, and comprising inorganic particles and a binder polymer disposed partially or totally on a surface of the inorganic particles, wherein the binder polymer connects and fixes the inorganic particles with each other; and
   an adhesive layer present on a surface of the porous coating layer, and comprising first adhesive resin particles having an average particle diameter corresponding to 0.8-3 times of an average particle diameter of the inorganic particles and second adhesive resin particles having an average particle diameter corresponding to 0.2-0.6 times of the average particle diameter of the inorganic particles, wherein the first adhesive resin particles are present in an amount of 30-90 wt % based on a total weight of the first adhesive resin particles and the second adhesive resin particles,
   wherein an upper portion of the adhesive layer has a larger number of pores as compared to a lower portion of the adhesive layer, said lower portion being in contact with the surface of the porous coating layer, and
   wherein the second adhesive resin particles infiltrate the surface of the porous coating layer and a part of the porous coating layer.

2. The separator for an electrochemical device according to claim 1, wherein the average particle diameter of the inorganic particles is 100-700 nm.

3. The separator for an electrochemical device according to claim 1, wherein the first and second adhesive resin particles independently comprise one or more resin selected from the group consisting of styrene butadiene rubber (SBR), acrylonitrile-butadiene rubber, acrylonitrile-butadiene-styrene rubber, polybutyl acrylate-co-ethylhexyl acrylate, polymethyl methacrylate-co-ethylhexyl acrylate, polyacrylonitrile, polyvinyl chloride, polyvinylidene fluoride, polyvinyl alcohol, and polycyanoacrylate.

4. The separator for an electrochemical device according to claim 1, wherein the average particle diameter of the first adhesive resin particles is 1-2.5 times of the average particle diameter of the inorganic particles, and the average particle diameter of the second adhesive resin particles is 0.3-0.6 times of that the average particle diameter of the inorganic particles.

5. The separator for an electrochemical device according to claim 1, wherein the average particle diameter of the first adhesive resin particles is 1-2 times of the average particle diameter of the inorganic particles, and the average particle diameter of the second adhesive resin particles is 0.3-0.6 times of the average particle diameter of the inorganic particles.

6. The separator for an electrochemical device according to claim 1, wherein the first adhesive resin particles are present in an amount of 50-85 wt % based on the total weight of the first adhesive resin particles and the second adhesive resin particles.

7. The separator for an electrochemical device according to claim 1, wherein the inorganic particles comprise one or more selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3\text{-}xPbTiO_3$ (PMNPT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, AlO(OH), $SiO_2$, $TiO_2$ and SiC.

8. The separator for an electrochemical device according to claim 1, wherein the porous coating layer has a thickness of 1-10 μm.

9. The separator for an electrochemical device according to claim 1, wherein the adhesive layer has a thickness of 0.5-3 μm.

10. The separator for an electrochemical device according to claim 1, wherein the porous coating layer is present directly on the surface of the porous polymer substrate.

11. The separator for an electrochemical device according to claim 1, wherein the adhesive layer is present directly on the surface of the porous coating layer.

12. The separator for an electrochemical device according to claim 1, wherein the first and second adhesive resin particles comprise the same resin.

13. The separator for an electrochemical device according to claim 1, wherein the first and second adhesive resin particles comprise different resins.

14. An electrochemical device comprising a cathode, an anode and a separator interposed between the cathode and the anode, wherein the separator is defined in claim 1.

15. The electrochemical device according to claim 14, which is a lithium secondary battery.

* * * * *